US011644867B2

(12) United States Patent
Ahn

(10) Patent No.: US 11,644,867 B2
(45) Date of Patent: May 9, 2023

(54) DISPLAY DEVICE

(71) Applicant: SAMSUNG DISPLAY CO., LTD., Yongin-si (KR)

(72) Inventor: Sungsang Ahn, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/221,828

(22) Filed: Apr. 4, 2021

(65) Prior Publication Data

US 2021/0405696 A1    Dec. 30, 2021

(30) Foreign Application Priority Data

Jun. 30, 2020  (KR) ......................... 10-2020-0080254

(51) Int. Cl.
*G09F 9/30* (2006.01)
*H01L 51/52* (2006.01)
*G06F 1/16* (2006.01)

(52) U.S. Cl.
CPC .......... *G06F 1/1624* (2013.01); *G06F 1/1647* (2013.01); *G06F 1/1652* (2013.01)

(58) Field of Classification Search
CPC .... G06F 1/1624; G06F 1/1647; G06F 1/1652; G06F 1/1641; G06F 1/1677; F16H 2025/204; F16H 25/2025; F16H 25/2204; F16H 25/24; F16H 2025/2075; F16H 2025/2081; H04M 1/0268; H04M 1/0237
USPC .................................................... 361/679.27
See application file for complete search history.

(56) References Cited

U.S. PATENT DOCUMENTS

| 8,711,566 | B2 | 4/2014 | O'Brien |
| 9,829,925 | B2 * | 11/2017 | Lim ....................... G06F 1/1637 |
| 10,079,270 | B2 | 9/2018 | Lee |
| 10,111,346 | B2 * | 10/2018 | Seo ........................ G06F 1/1643 |
| 10,553,135 | B2 | 2/2020 | Lee et al. |
| 10,747,269 | B1 * | 8/2020 | Choi ..................... G06F 1/1624 |
| 10,868,897 | B2 * | 12/2020 | Cha ..................... H04M 1/0268 |
| 11,071,218 | B2 * | 7/2021 | Wittenberg ......... H01L 27/3244 |
| 11,199,876 | B2 * | 12/2021 | Lee ....................... G06F 1/1637 |
| 2011/0032175 | A1 * | 2/2011 | Kang .................... G06F 1/1641 345/1.3 |
| 2018/0188778 | A1 * | 7/2018 | Shin ...................... G06F 1/1624 |

(Continued)

FOREIGN PATENT DOCUMENTS

| KR | 10-2016-0127277 | 11/2016 |
| KR | 10-2016-0141255 | 12/2016 |

(Continued)

*Primary Examiner* — Adrian S Wilson
*Assistant Examiner* — Gage Crum
(74) *Attorney, Agent, or Firm* — H.C. Park & Associates, PLC

(57) ABSTRACT

A display device including a display module having a first area exposed to an outside in a first state and a second state and a second area defined adjacent to the first area and exposed to the outside in the second state, a case accommodating the display module, and a driver controlling the first state and the second state of the display module. The driver includes a first driving module fixed to the case, a second driving module coupled to the first driving module, and a sliding module coupled to the second driving module and moving in a direction closer to or farther away from the second motor according to a rotation of the second screw.

18 Claims, 10 Drawing Sheets

(56) References Cited

U.S. PATENT DOCUMENTS

| | | | |
|---|---|---|---|
| 2019/0390752 A1* | 12/2019 | Tsai | F16H 25/2015 |
| 2020/0022271 A1* | 1/2020 | Park | H05K 5/0017 |
| 2020/0135064 A1* | 4/2020 | Lee | G06F 1/1652 |
| 2020/0267246 A1* | 8/2020 | Song | H04M 1/0268 |
| 2020/0329572 A1* | 10/2020 | Wittenberg | H05K 5/0017 |
| 2021/0223820 A1* | 7/2021 | Yoo | G06F 1/1681 |
| 2022/0038564 A1* | 2/2022 | Li | G06F 1/1652 |

FOREIGN PATENT DOCUMENTS

| | | |
|---|---|---|
| KR | 10-1758835 | 7/2017 |
| KR | 10-2018-0030301 | 3/2018 |
| KR | 10-2018-0038605 | 4/2018 |
| KR | 10-2019-0062855 | 6/2019 |
| KR | 10-1993390 | 6/2019 |
| WO | WO-2021244152 A1 * | 12/2021 |

* cited by examiner

DISPLAY DEVICE

CROSS-REFERENCE TO RELATED APPLICATION

This application claims priority from and the benefit of Korean Patent Application No. 10-2020-0080254, filed on Jun. 30, 2020, which is hereby incorporated by reference for all purposes as if fully set forth herein.

BACKGROUND

Field

Embodiments of the invention relate to a display device. More particularly, embodiments relate to a display device including a display module that may expand or contract.

Discussion of the Background

Electronic devices that provide images to a user, such as a smartphone, a digital camera, a notebook computer, a navigation unit, and a smart television, include a display device to display the images. The display device generates the images and provides the images to the user through a display screen.

In recent years, various types of display devices are being developed which include technical improvements in the display devices. For example, various flexible display devices that are foldable or scrollable are being developed. The flexible display devices that are able to be changed to various shapes are easy to carry and improve a user's convenience.

The flexible display device provides the user with the display screen of various sizes. For example, the flexible display device operates in a basic mode and an expanded mode. In the basic mode, a portion of a flexible display module is exposed, and the other portion of the flexible display module is inserted into a case. The other portion that is inserted into the case is pulled out and unfolded in the expanded mode.

The above information disclosed in this Background section is only for understanding of the background of the inventive concepts, and, therefore, it may contain information that does not constitute prior art.

SUMMARY

Embodiments of the invention provide a display device capable of reducing the number of defects generated when a display module expands or contracts.

Additional features of the inventive concepts will be set forth in the description which follows, and in part will be apparent from the description, or may be learned by practice of the inventive concepts.

An embodiment of the invention provides a display device including a display module including a first area exposed to an outside in a first state and a second state and a second area defined adjacent to the first area and exposed to the outside in the second state, a case accommodating the display module, and a driver controlling the first state and the second state of the display module. The driver includes a first driving module including a first motor fixed to the case and a first screw coupled to the first motor and extending in one side in a first direction, a second driving module including a second motor coupled to the first screw and moving in a direction closer to or farther away from the first motor due to a rotating operation of the first screw and a second screw coupled to the second motor and extending in the other side in the first direction, and a sliding module coupled to the second screw and moving in a direction closer to or farther away from the second motor due to a rotating operation of the second screw.

The case may include a first case fixedly coupled to the display module and the first driving module and a second case coupled to the first case to move in a direction closer to or farther away from the first case in the first direction.

One end of the sliding module may be coupled to the second case, and the sliding module may move closer to or farther away from the second motor when the second case moves closer to or farther away from the first case.

The display device may further include a roller that inserts the display module into the case in the first state and pulls out the display module from the case in the second state.

The sliding module may include a first portion coupled to the second screw and extending in the first direction, a second portion coupled to the display module and extending in a second direction crossing the first direction, and a third portion disposed between the first portion and the second portion to couple the sliding module to the case.

The second portion may include a roller, and the display module is inserted into the case by the roller when the sliding module moves in the direction closer to the second motor and is pulled out from the case by the roller when the sliding module moves in the direction farther away from the second motor.

Each of the first driving module and the second driving module may be provided in plural.

The first portion of the sliding module may be provided in plural, and the second screw of the second driving modules may be respectively coupled to the first portions.

The second motor may include a motor part controlling a rotation of the second screw and a connection part physically connecting the motor part to the first screw.

The second driving module may be coupled to the first case to be slidable in the first direction.

A direction of a thread of the first screw may be opposite to a direction of a thread of the second screw.

A length in the first direction of the first screw may be substantially the same as a length in the first direction of the second screw.

The display device may further include at least one elastic member in which one end thereof is fixed to the second case and the other end thereof is fixed to the display module.

The elastic member may be stretched in the second state of the display module and contracted in the first state of the display module.

Another embodiment of the invention provides a display device including a display module including a first area always exposed to an outside and a second area defined adjacent to the first area, hidden from the outside in a first state, and exposed to the outside in a second state, a case accommodating the display module and including a first case and a second case slide-coupled to the first case, a driver fixed to the case to change an operating state of the display module to the first state or the second state while the second case slides, and a roller connected to the driver to insert the second area of the display module into the case or pull out the second area of the display module from the case. The driver includes a first driving module fixed to an inner sidewall of the first case and a second driving module coupled to the first driving module to be movable. Wherein the roller is fixed to the second case and coupled to the second driving module to be movable.

The first driving module may include a first motor and a first screw coupled to the first motor and extending in one side in a first direction, and the second driving module may include a second motor coupled to the first screw and a second screw coupled to the second motor and extending in the other side opposite to the one side in the first direction.

The roller may move in a direction closer to the second driving module when the second driving module moves in a direction farther away from the first driving module and may move in a direction farther away from the second driving module when the second driving module moves in a direction closer to the first driving module.

A direction of a thread of the first screw may be opposite to a direction of a thread of the second screw.

The roller may include a connection rod of which one end is connected to the second screw and a roller rod extending from the other end of the connection rod in a second direction crossing the first direction, and the roller rod may pull out the second area of the display module from the case when the connection rod moves in a direction farther away from the second driving module and inserts the second area of the display module into the case when the connection rod moves in a direction closer to the second driving module.

The driver may include a first driver and a second driver, the first driver is fixed to one sidewall of the case, and the second driver is fixed to the other sidewall opposite to the one sidewall of the case.

According to the above, the display device may be provided as a slidable display device, and thus, defects occurring when the display module is expanded or contracted may be prevented. In addition, since the slidable display device is operated using motors and the screws rotated by the motors, reliability of the slidable display device may be improved.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the inventive concepts.

DETAILED DESCRIPTION

Figure 1A:
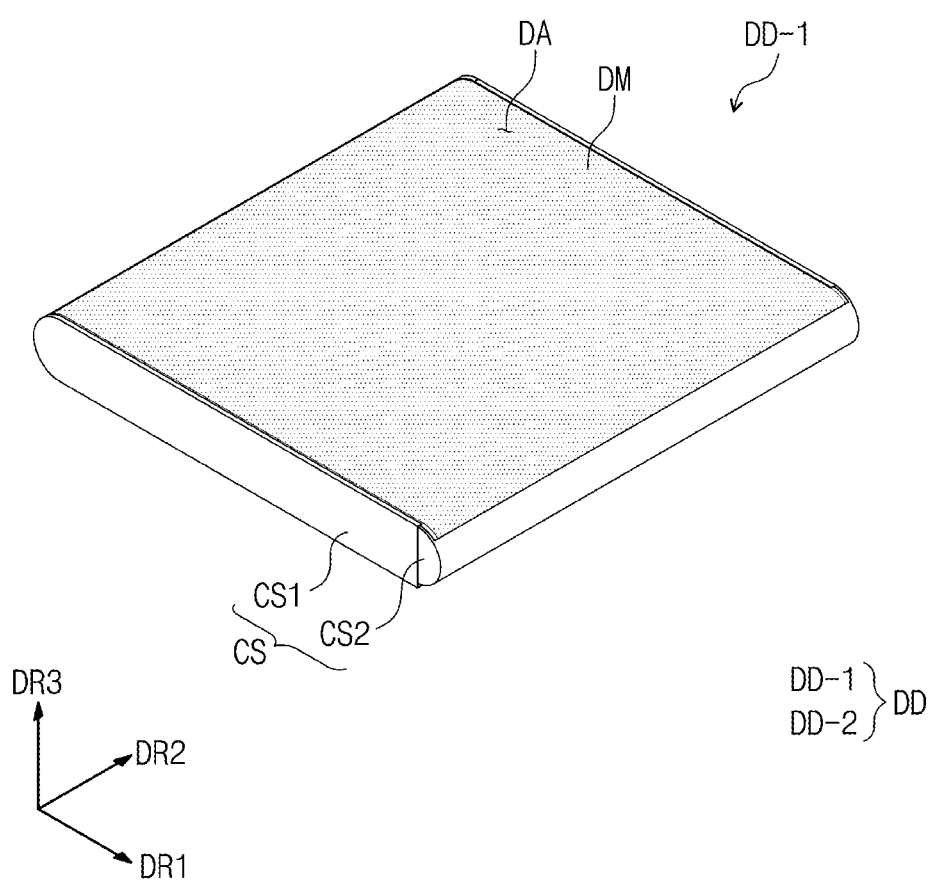
FIGS. 1A and 1B are perspective views showing display devices according to an embodiment of the invention.

In the following description, for the purposes of explanation, numerous specific details are set forth in order to provide a thorough understanding of various embodiments or implementations of the invention. As used herein "embodiments" are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element or a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the DR1-axis, the DR2-axis, and the DR3-axis are not limited to three axes of a rectangular coordinate system, such as the x, y, and z-axes, and may be interpreted in a broader sense. For example, the DR1-axis, the DR2-axis, and the DR3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As is customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, the invention will be explained in detail with reference to the accompanying drawings.

Figure 1B:
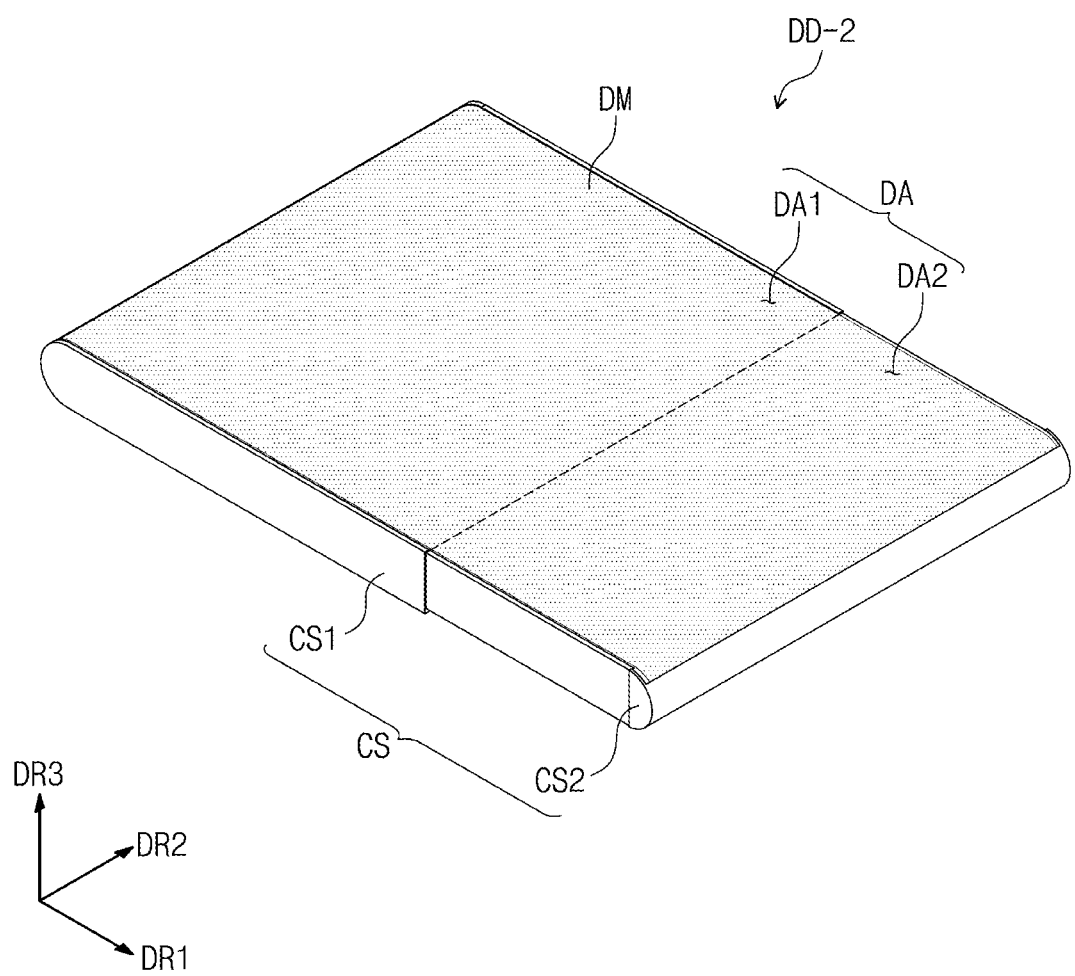

FIGS. 1A and 1B are perspective views showing display devices DD-1 and DD-2 according to an embodiment of the invention.

FIG. 1A shows the display device DD-1 in a first state, and FIG. 1B shows the display device DD-2 in a second state.

A display device DD may be activated in response to electrical signals. The display device DD may include various embodiments. For example, the display device DD may be applied to a large-sized electronic item, such as a television set, a monitor, or an outdoor billboard, and a small and medium-sized electronic item, such as a personal computer, a notebook computer, a personal digital assistant, a car navigation unit, a game unit, a mobile electronic device, and a camera. However, these are merely exemplary, and the display device DD may be applied to other display items as long as they do not depart from the inventive concepts. In the present embodiment, a smartphone will be described as a representative example of the display device DD.

The display device DD may be an expandable display device. The display device DD may be a slidable display device of the expandable display device. The slidable display device may include a display module DM that expands or contracts according to a sliding operation of a case CS thereof.

Referring to FIGS. 1A and 1B, the display device DD may include the case CS and the display module DM. The display device DD may operate in the first state or the second state. The first state indicates a state in which the display module DM is not expanded, and the second state indicates a state in which the display module DM is expanded. That is, a display area DA of the display device DD-2 in the second state is greater than that of the display device DD-1 in the first state.

The display module DM may display an image to a user. The display area DA may be defined in the display module DM, and the display area DA may include a first area DA1 and a second area DA2. The display module DM may be fixed to the case CS and may extend in a first direction DR1. According to an embodiment, one end of the display module DM may be fixed to a first case CS1 or a second case CS2. The display module DM may be a flexible display module. The first area DA1 may be exposed to the outside in the first state and the second state, and the second area DA2 may be exposed to the outside only in the second state.

The case CS may accommodate the display module DM. The case CS may include the first case CS1 and the second case CS2. The second case CS2 may move in the first direction DR1 to be coupled to the first case CS1. In the present embodiment, the first case CS1 may be referred to as an "outer case", and the second case CS2 may be referred to as an "inner case". That is, the second case CS2 may be slid inside the first case CS1 while being coupled to the first case CS1.

Referring to FIG. 1A, the first area DA1 may be exposed to the outside when the display device DD-1 is in the first state. The second area DA2 (refer to FIG. 1B) is hidden inside the case CS. That is, the display device DD-1 in the first state may provide only the first area DA1 to the user. The first state of the display device DD-1 may be a state in which the case CS is closed, and in detail, may be a state in which the second case CS2 is slid in a direction closer to the first case CS1.

Referring to FIG. 1B, the first area DA1 and the second area DA2 of the display module DM of the display device DD-2 may be exposed to the outside in the second state. The user may view both the first and second areas DA1 and DA2 in the second state of the display device DD-2. The second state of the display device DD-2 may be a state in which the case CS is open, and in detail, may be a state in which the second case CS2 is slid in a direction far away from the first case CS1.

Figure 2A:
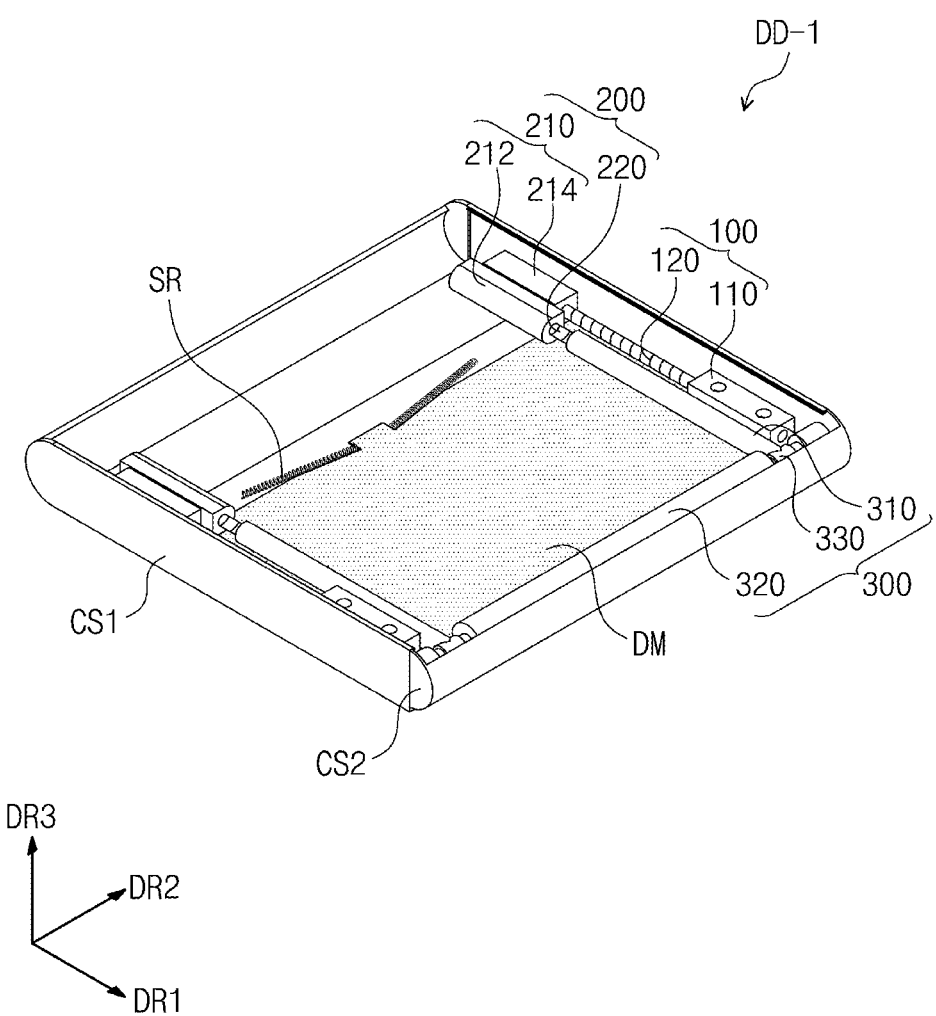
FIGS. 2A and 2B are perspective views showing display devices according to an embodiment of the invention.
Figure 2B:
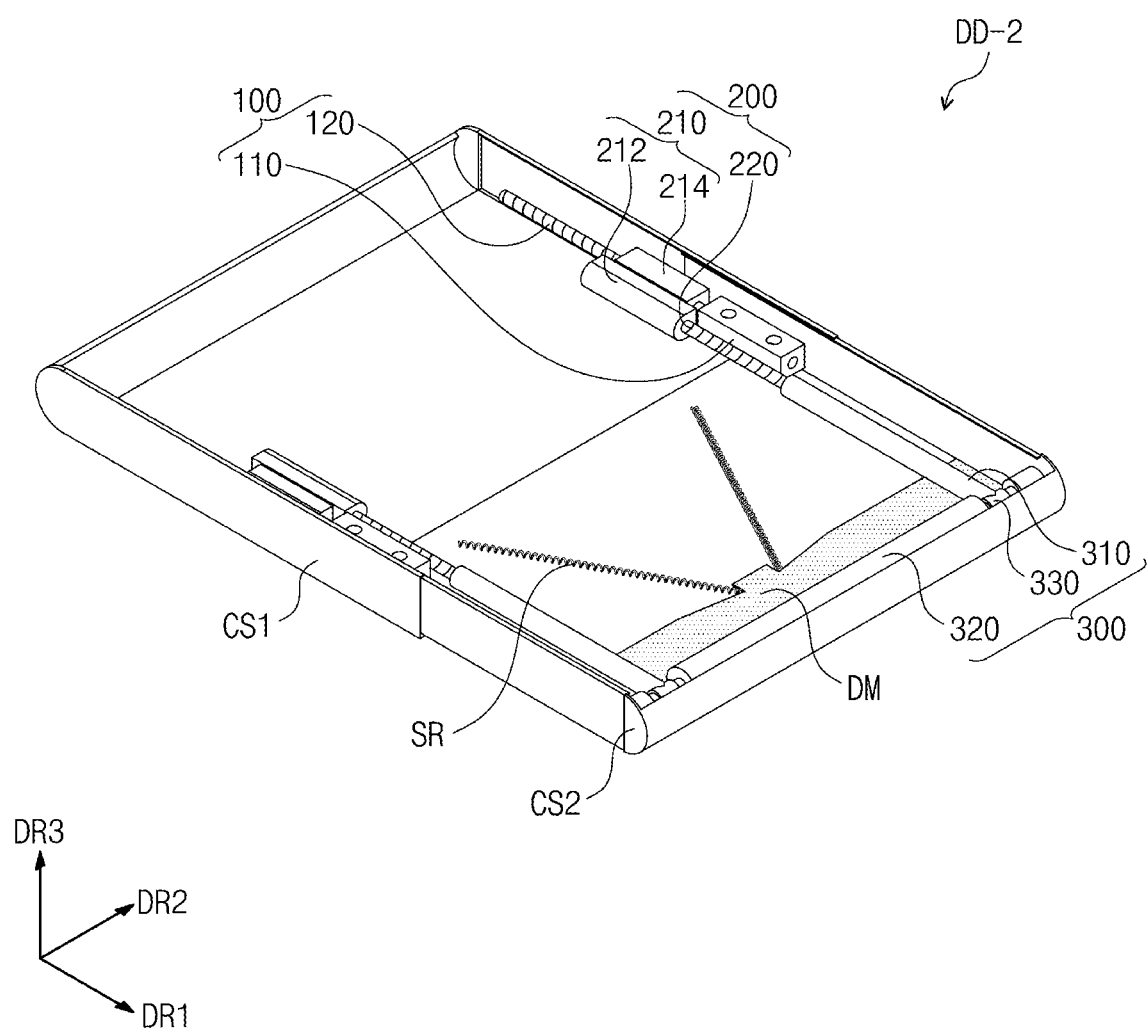

FIGS. 2A and 2B are perspective views showing the display devices DD-1 and DD-2 according to an embodiment of the invention.

FIG. 2A shows the inside of the case CS of the display device DD-1 in the first state, and FIG. 2B shows the inside of the case CS of the display device DD-2 in the second state. In FIGS. 2A and 2B, the display module DM (refer to FIGS. 1A and 1B) disposed in the display area DA is shown transparently to show the inside of the case CS.

Referring to FIGS. 2A and 2B, the display devices DD-1 and DD-2 may include a driver disposed in the case CS. The driver may include a first driving module 100, a second driving module 200, and a sliding module 300. The driver may change an operating state of the display device DD to the first state or the second state in response to a user's control. According to an embodiment, the driver may automatically control the first state and the second state of the display device DD in response to a user's input. For example, when an expansion command of the display module DM is input by the user of the display device DD, e.g., the smartphone, the driver may change the operating state of the display device DD to the second state from the first state. When a contraction command of the display module DM is input by the user, the driver may change the operating state of the display device DD to the first state from the second state.

The driver may drive the first driving module 100 and the second driving module 200 and may control an operation of the sliding module 300 to change the operating state of the display device DD to the first state or the second state. The first driving module 100 and the second driving module 200 may be substantially simultaneously operated. The second driving module 200 may be connected to the first driving module 100, and may move in the first direction DR1 according to the operation of the first driving module 100. The second driving module 200 may be substantially simultaneously operated with, but separately operated from, the first driving module 100. The sliding module 300 may move in the first direction DR1 according to the operation of the second driving module 200. Due to the movement of the second driving module 200 and the sliding module 300, the operating state of the display device DD may be changed to the first state or the second state.

The first driving module 100 may be coupled to the first case CS1. The first driving module 100 may be fixed to a sidewall of the first case CS1 in a second direction DR2.

The first driving module 100 may include a first motor 110 and a first screw 120. The first screw 120 may be mechanically coupled to the first motor 110. In this case, the expression "mechanical coupling" is different from the simple physical coupling, and means a relationship in which an operation of the first motor 110 directly affects an operation of the first screw 120. The first motor 110 may rotate the first screw 120 coupled to one end thereof. One end of the first screw 120 may be coupled to the first motor 110 and may extend in the first direction DR1. The first screw 120 may correspond to various types of threaded fasteners including screws and bolts. The first screw 120 may include a body and a thread defined on the body.

The second driving module 200 may include a second motor 210 and a second screw 220. The second screw 220 may be mechanically coupled to the second motor 210. The second motor 210 may rotate the second screw 220. One end of the second screw 220 may be coupled to the second motor 210, and the second screw 220 may extend in a direction opposite to the direction in which the first screw 120 extends in the first direction DR1. The second screw 220 may include a body and a thread defined on the body. A direction of the thread of the second screw 220 may be opposite to a direction of the thread of the first screw 120. For example, when the thread of the first screw 120 is a left-hand thread, the thread of the second screw 220 is a right-hand thread, and when the thread of the first screw 120 is the right-hand thread, the thread of the second screw 220 is the left-hand thread.

The second motor 210 may be fixed to the first screw 120 and may move in a direction closer to or farther away from the first motor 110 in the first direction DR1 according to the rotation of the first screw 120.

The second motor 210 may include a motor part 212 that controls a rotation of the second screw 220 and a connection part 214 that connects the motor part 212 to the first screw 120.

The second screw 220 may be mechanically coupled to the one end of the motor part 212. The motor part 212 may control the rotation of the second screw 220 coupled to the one end thereof. The motor part 212 may be coupled to the connection part 214 in the second direction DR2.

The connection part 214 may physically connect the second driving module 200 to the first screw 120. The connection part 214 may include an internal thread which is engaged with an external thread of the first screw 120 at an inner surface thereof. For example, the connection part 214 may correspond to a nut. The connection part 214 may move in a direction closer to or farther away from the first motor 110 according to the rotation of the first screw 120, and thus, the motor part 212 may move together with the connection part 214.

The second driving module 200 may be slide-coupled to the sidewall of the first case CS1. Although not shown in figures, the connection part 214 of the second driving module 200 may be coupled to the first screw 120 at an inner side thereof and may be coupled to an inner sidewall of the first case CS1 at an outer side thereof to be movable.

The sliding module 300 may be coupled to the second screw 220 and may move in a direction closer to or farther away from the second motor 210 according to the rotation of the second screw 220. The sliding module 300 may include a first portion 310, a second portion 320, and a third portion 330.

The first portion 310 may be coupled to the second screw 220. The first portion 310 may be a connection rod 310 that extends in the first direction DR1. An internal thread that is engaged with an external thread of the second screw 220 may be defined in an inner surface of the first portion 310. The first portion 310 may move in a direction closer to or farther away from the second motor 210 in the first direction DR1 according to the rotation of the second screw 220.

The second portion 320 may extend in the second direction DR2. The second portion 320 may include a roller. The second portion 320 may be referred to as a "roller rod". The display module DM may be coupled to the second portion 320. The second portion 320 may be rotated by a horizontal movement of the first portion 310 to pull out or insert the display module DM. In more detail, the second portion 320 may expose or hide the second area DA2 of the display module DM to or from the outside using the rotation of the roller. In FIGS. 2A and 2B, when the sliding module 300 moves in the direction closer to the second motor 210, the display module DM may be inserted into the first case CS1, and when the sliding module 300 moves in the direction farther away from the second motor 210, the display module DM may be pulled out from the first case CS1.

Although not shown in the drawings, the second portion 320 may be a fixing rod that fixes the sliding module 300 to the second case CS2 according to another embodiment. In this case, the second portion 320 may be fixed to one end of the second case CS2. In addition, one end of the display module DM may be fixed to the second portion 320. A roller (not shown) may be separately coupled to the first case CS1. The roller (not shown) may be coupled to the one end of the first case CS1 and may insert or pull out the display module DM according to the movement of the sliding module 300. In this case, the roller (not shown) may rotate to expose or hide a portion of the first area of the display module DM to or from the outside. The second area may be always exposed to the outside.

The third portion 330 may be disposed between the first portion 310 and the second portion 320. The third portion 330 may connect the first portion 310 to the second portion 320. Simultaneously, the third portion 330 may be connected to the second case CS2. Consequently, the third portion 330 may fix the sliding module 300 to the second case CS2. Accordingly, the sliding module 300 may be coupled to the second case CS2. When the second case CS2 moves in the direction farther away from the first case CS1, the sliding module 300 may move farther away from the second motor 210, and when the second case CS2 moves in the direction closer to the first case CS1, the sliding module 300 may move closer to the second motor 210

Figure 3A:
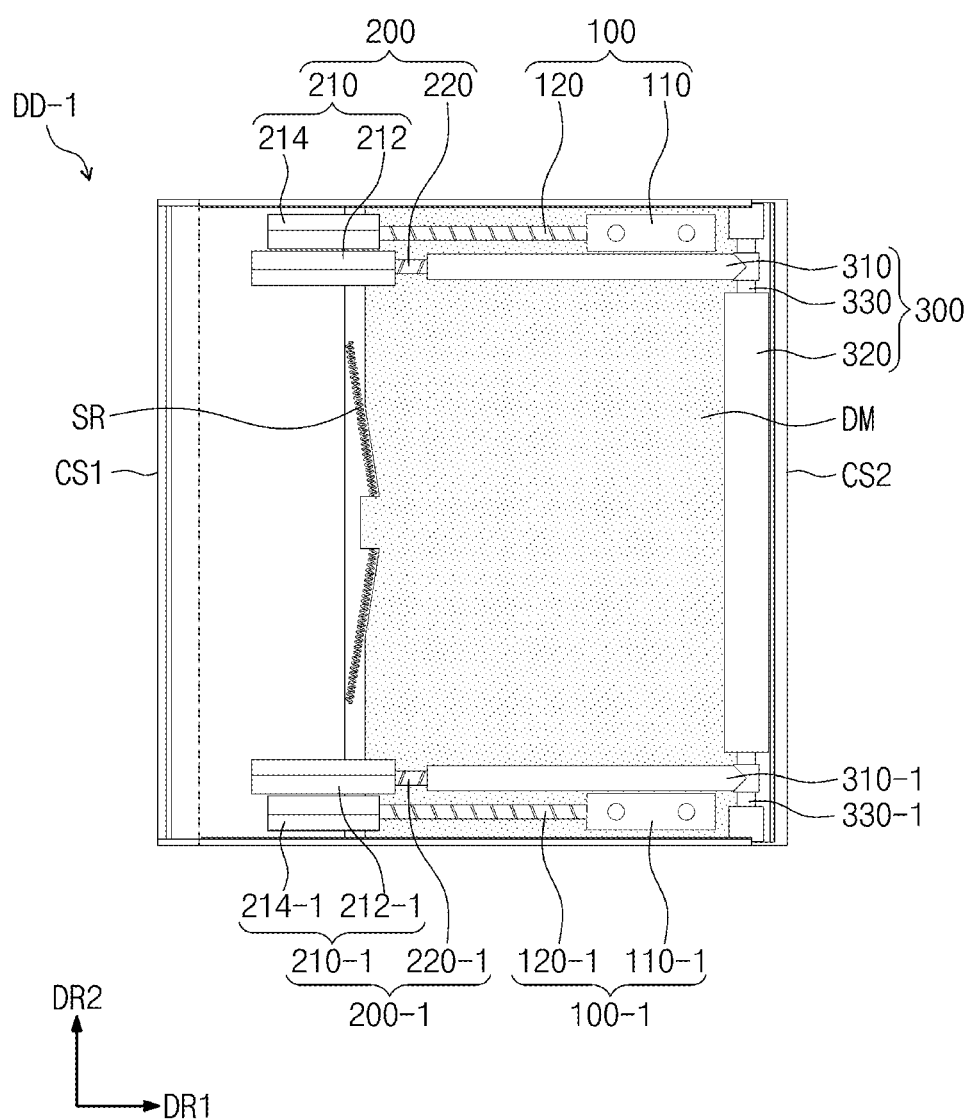
FIGS. 3A and 3B are plan views showing display devices according to an embodiment of the invention.
Figure 3B:
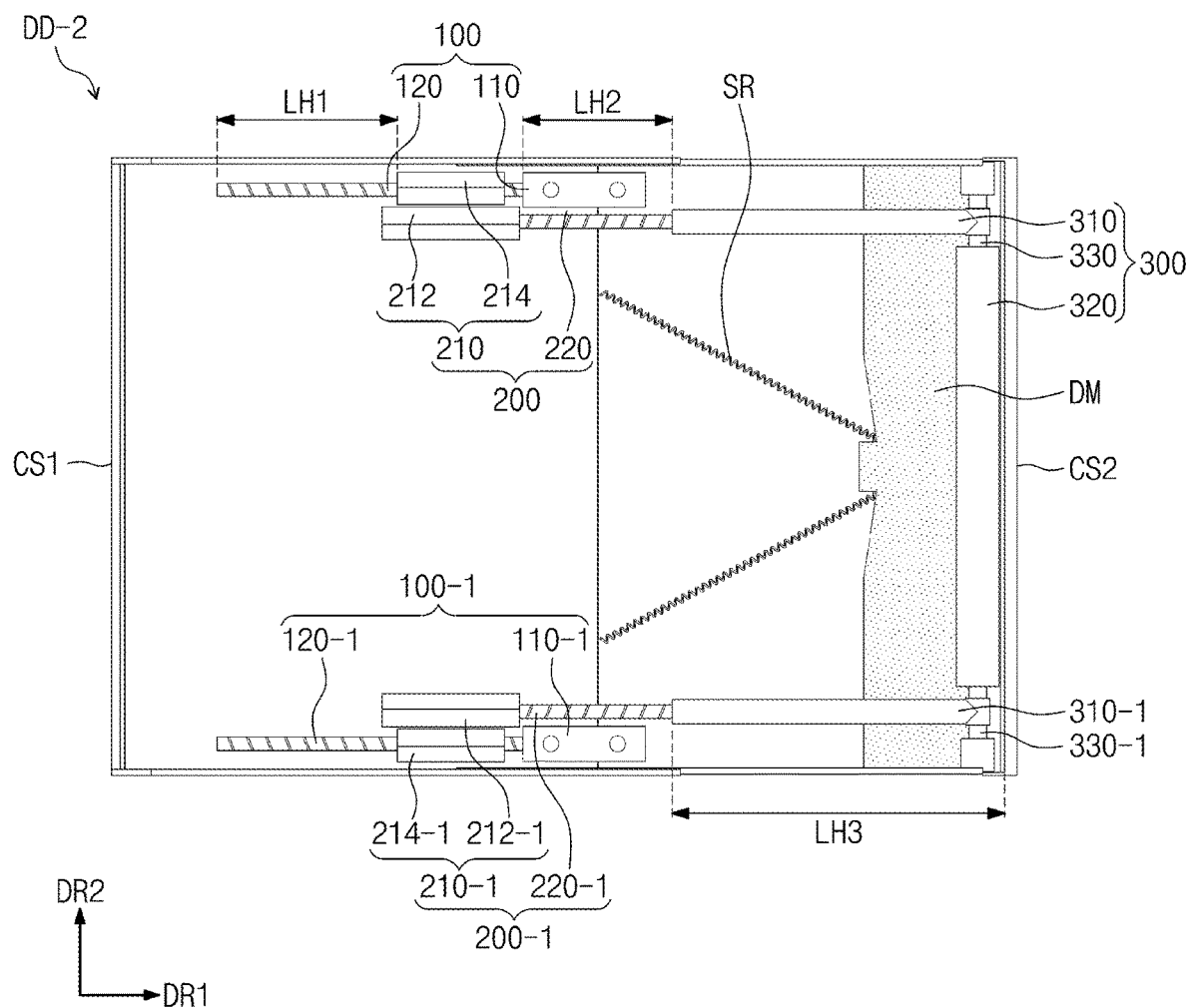

FIGS. 3A and 3B are plan views showing the display devices DD-1 and DD-2 according to an embodiment of the invention.

FIG. 3A shows the display device DD-1 in the first state, and FIG. 3B shows the display device DD-2 in the second state.

The display device DD may include a plurality of first driving modules and a plurality of second driving modules. Referring to FIGS. 3A and 3B, the driver may include a first driver and a second driver. The first driver may be fixed to the one sidewall of the case CS, and the second driver may be fixed to the other sidewall opposite to the one sidewall of the case CS. The first driver may include a first driving module 100 and a second driving module 200, and the second driver may include a first driving module 100-1 and a second driving module 200-1. The first and second drivers may share the sliding module 300, which may include the roller.

The sliding module 300 may include first portions 310 and 310-1, a second portion 320, and third portions 330 and 330-1. The first and second drivers may share the second portion 320. The first portions 310 and 310-1 may be coupled to opposite ends of the second portion 320, and the third portions 330 and 330-1 may be coupled to the opposite ends of the second portion 320.

In FIG. 3B, directions of the threads of the first and second screws 120 and 220 may be opposite to each other. The second driving module 200 may move in proportion to a length LH1 in the first direction DR1 of the first screw 120, and the sliding module 300 may move in proportion to a length LH2 in the first direction DR1 of the second screw 220. A total movement distance of the sliding module 300 may correspond to a sum of the length LH1 of the first screw 120 and the length LH2 of the second screw 220. The total movement distance of the sliding module 300 may be substantially the same as a sliding distance LH3 of the second case CS2. For example, the sum of the length LH1 of the first screw 120 and the length LH2 of the second screw 220 may be substantially the same as the sliding distance LH3 of the second case CS2.

According to an embodiment, the length LH1 in the first direction DR1 of the first screw 120 and the length LH2 in the first direction DR1 of the second screw 220 may be substantially equal to each other.

According to an embodiment, the display devices DD-1 and DD-2 may include an elastic member SR. The elastic member SR may be a spring. The spring may be a variety of springs, e.g., a torsion spring. One end of the elastic member SR may be fixed to the second case CS2, and the other end of the elastic member SR may be fixed to the display module DM. In the present embodiment, at least one elastic member SR may be provided. Although two elastic members SR are shown in figures, the number of the elastic members SR should not be limited thereto. That is, one or three or more elastic members SR may be applied to the display devices DD-1 and DD-2.

Figure 4A:
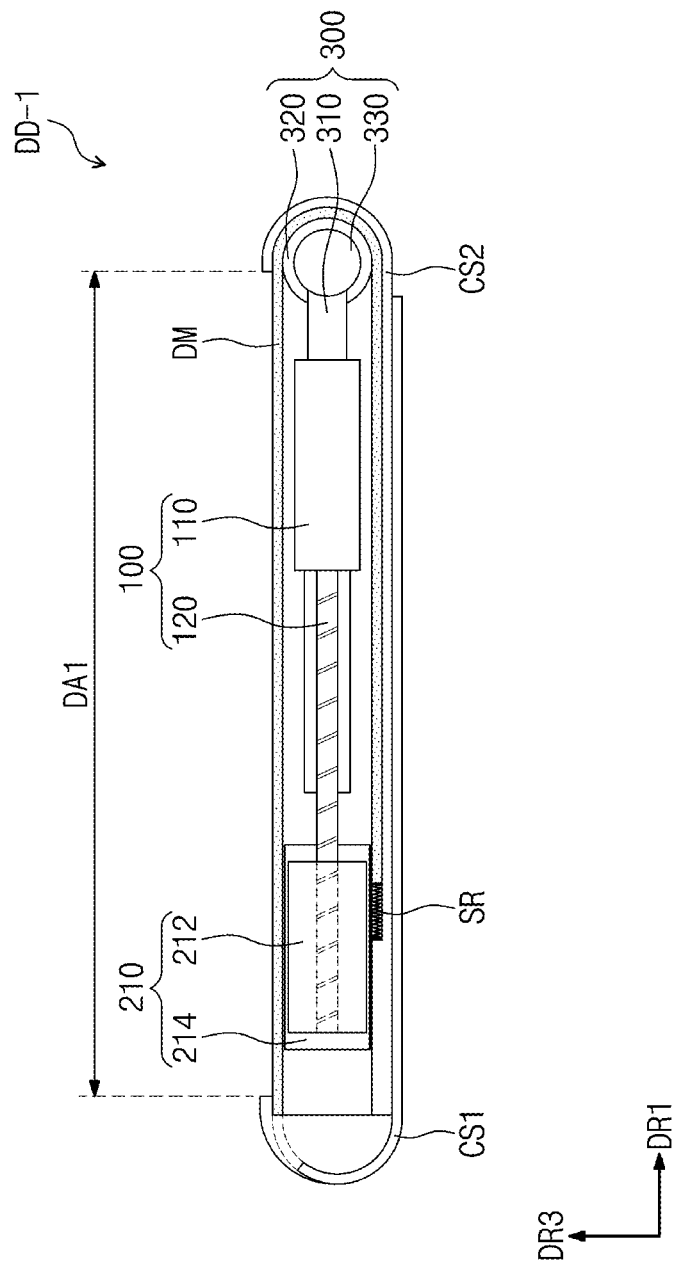
FIGS. 4A and 4B are cross-sectional views showing display devices according to an embodiment of the invention.
Figure 4B:
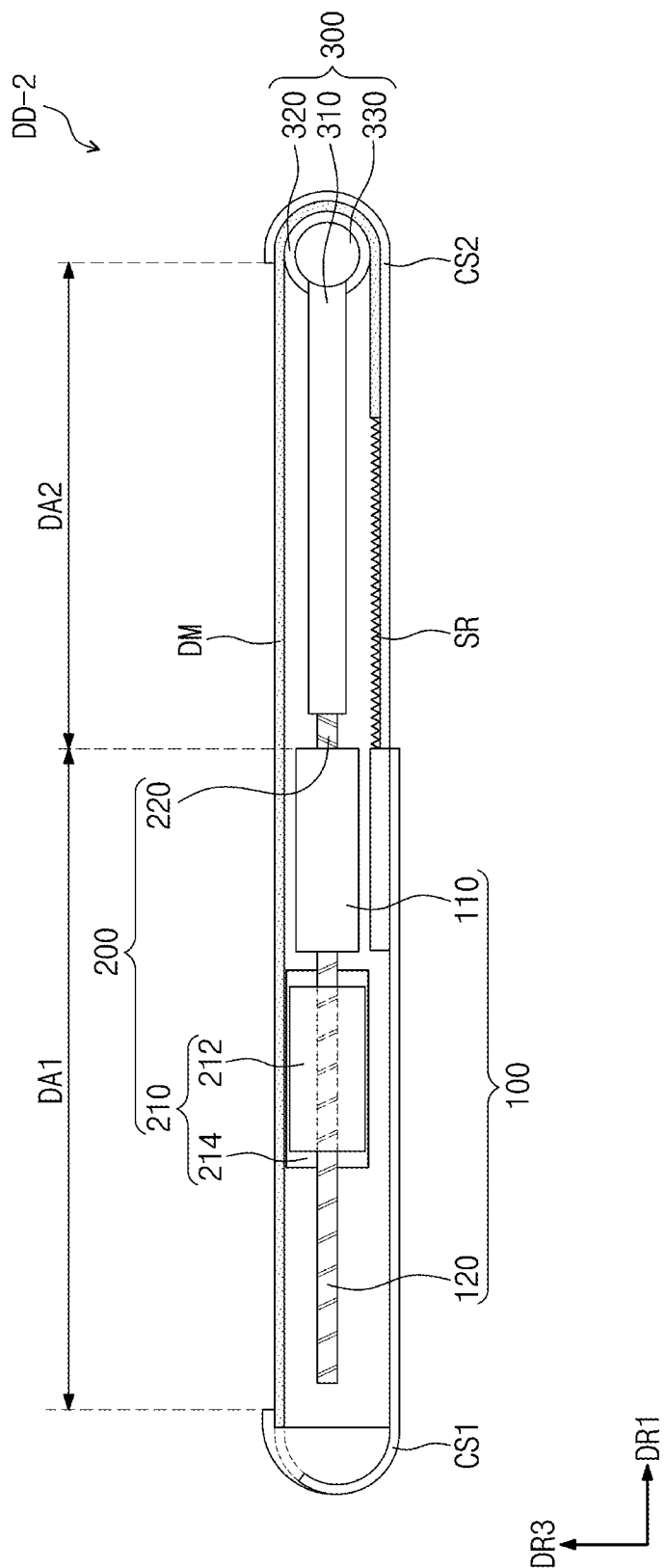

FIGS. 4A and 4B are cross-sectional views showing the display devices DD-1 and DD-2 according to an embodiment of the invention. FIGS. 4A and 4B shows the display devices DD-1 and DD-2 when viewed in the second direction DR2.

FIG. 4A shows the display device DD-1 in the first state, and FIG. 4B shows the display device DD-2 in the second state. In more detail, FIGS. 4A and 4B show the movement of the sliding module 300 in the first direction DR1. FIGS. 4A and 4B respectively show the first and second states of the display module DM.

In the display device DD-1 in the first state as shown in FIG. 4A, the first area DA1 of the display module DM may be exposed to the outside. The display device DD-1 may display the image through the first area DA1. The second area DA2 of the display module DM may be inserted into the first case CS1 by the roller of the second portion 320 of the sliding module 300 (hereinafter, referred to as the "roller") and may be disposed in the first case CS1.

In the display device DD-2 in the second state as shown in FIG. 4B, the first area DA1 and the second area DA2 of the display module DM may be exposed to the outside. That is, the display device DD-2 may display the expanded image to the user through the first area DA1 and the second area DA2.

In FIGS. 4A and 4B, the roller in the sliding module 300 may be coupled to the second case CS2. When the second case CS2 moves in the direction farther away from the first case CS1, the roller in the sliding module 300 may move in the direction farther away from the first case CS1.

When the second driving module 200 moves in a direction farther away from the first driving module 100, the roller in the sliding module 300 may move in a direction closer to the second driving module 200. When the second driving module 200 moves in a direction closer to the first driving module 100, the roller in the sliding module 300 may move in a direction farther away from the second driving module 200.

That is, the second driving module 200 and the roller in the sliding module 300 may always move in the same direction in the first direction DR1. The movement distance of the roller in the sliding module 300 may be greater than the movement distance of the second driving module 200.

The roller in the sliding module 300 may include the connection rod 310 and the roller rod 320. The connection rod 310 may be connected to the second screw 220 and may move in the first direction DR1 according to the rotation of the second screw 220. The roller rod 320 may be coupled to the display module DM. The roller rod 320 may rotate according to the movement of the connection rod 310 to pull out or insert the display module DM. According to an embodiment, when the connection rod 310 moves in the direction farther away from the second driving module 200, the roller rod 320 may pull out the second area DA2 of the display module DM. When the connection rod 310 moves in the direction closer to the second driving module 200, the roller rod 320 may insert the second area DA2 of the display module DM.

The elastic member SR may be stretched or contracted by an elastic force thereof. One end of the elastic member SR may be coupled to the one end of the second case CS2 disposed in the first case CS1. The other end of the elastic member SR, which is opposite to the one end of the elastic member SR, may be coupled to the one end of the display module DM disposed in the second case CS2. When the operating state of the display device DD is changed from the first state to the second state, the elastic member SR may be stretched and pulls the display module DM in the first direction DR1 using the elastic force. The display module DM may maintain a flat state by the elastic force of the elastic member SR in the first and second states. The display module DM may maintain a tension by the elastic force of the elastic member SR even in the process of changing between the first state and the second state. The elastic member SR may be contracted when the operating state of the display device DD is changed from the second state to the first state.

Figure 5:
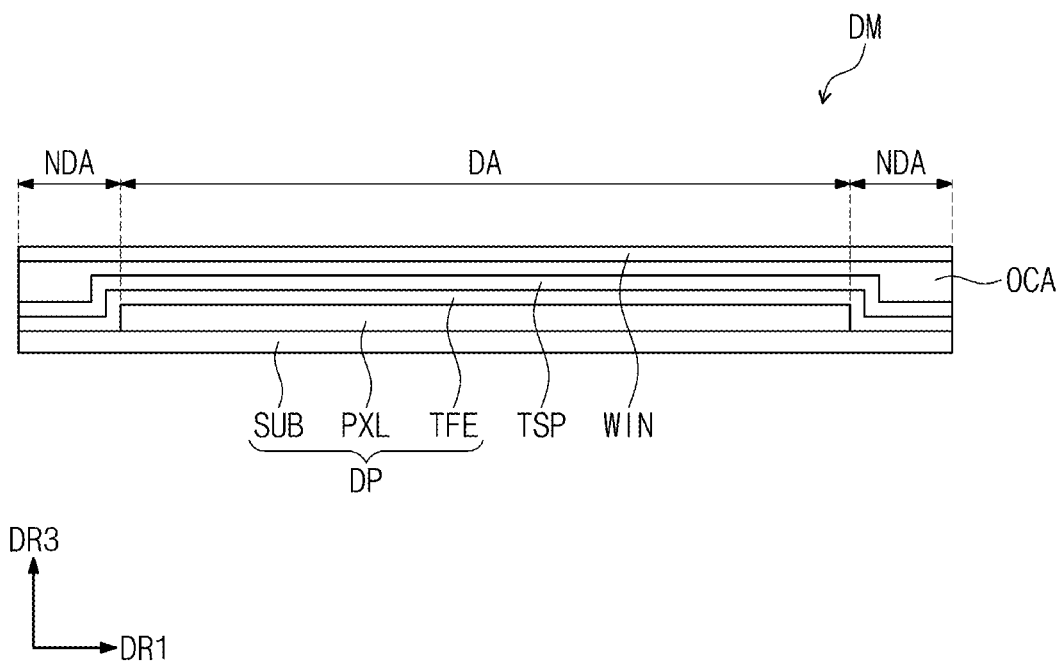
FIG. 5 is a cross-sectional view showing a display module according to an embodiment of the invention.
Figure 6:
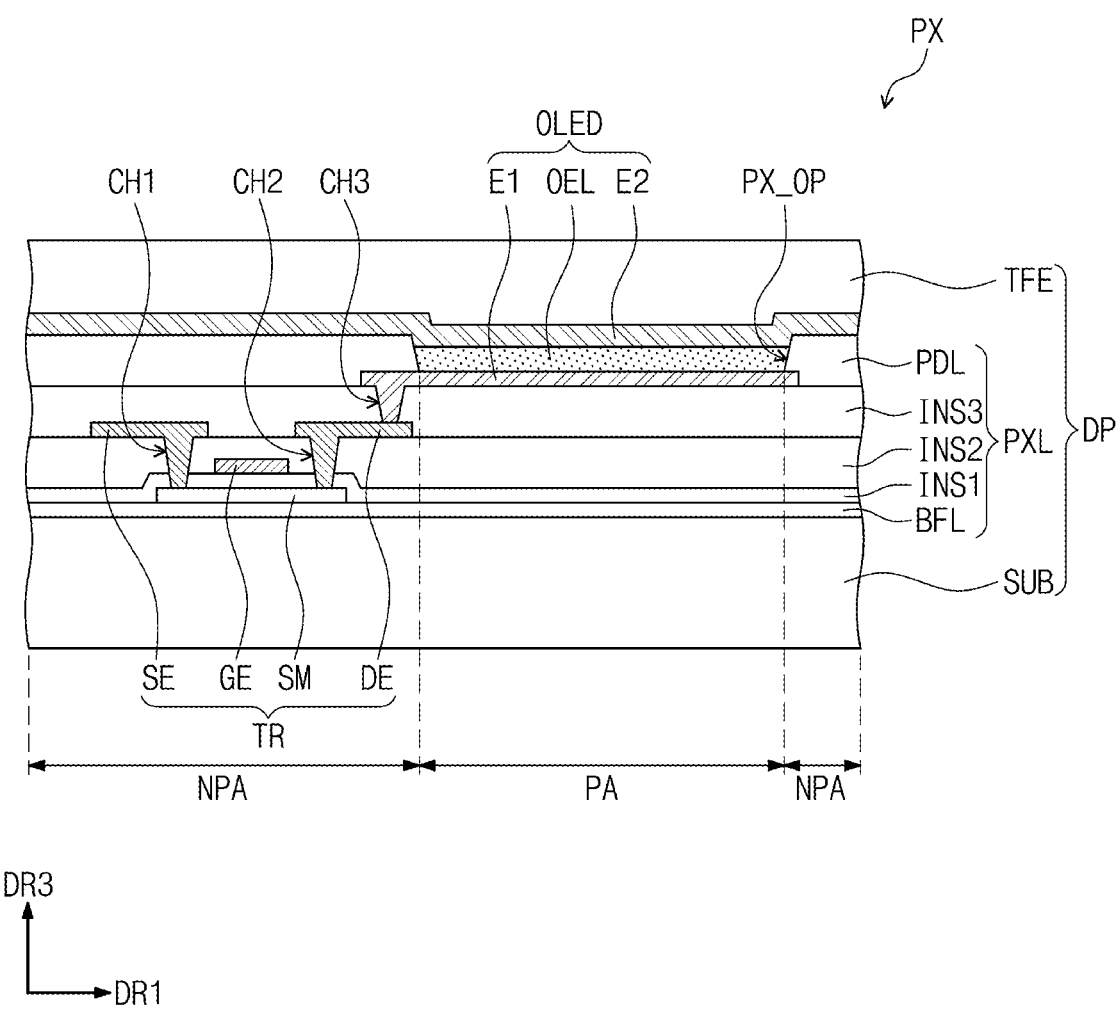
FIG. 6 is a cross-sectional view showing a display module according to an embodiment of the invention.

FIG. 5 is a cross-sectional view showing the display module DM according to an embodiment of the present disclosure, and FIG. 6 is a cross-sectional view showing a pixel according to an embodiment of the invention.

FIG. 5 is a cross-sectional view schematically showing the display module DM shown in FIG. 1, and FIG. 6 is an enlarged view showing the pixel according to an embodiment of the invention.

Referring to FIG. 5, the display module DM may include a display panel DP, a touch sensing unit TSP disposed on the display panel DP, a window WIN disposed on the touch sensing unit TSP, and an adhesive OCA disposed between the touch sensing unit TSP and the window WIN.

The display panel DP may be an organic light emitting display panel. However, the inventive concepts should not be limited thereto. Various display panels that display images, such as a liquid crystal display panel, an electrowetting display panel, and an electrophoretic display panel, or the like, may be used as the display panel DP. The display panel DP may be a flexible display panel.

The display panel DP may include a substrate SUB, a pixel layer PXL disposed on the substrate SUB, and a thin film encapsulation layer TFE disposed on the pixel layer PXL to cover the substrate SUB. The substrate SUB may be a transparent substrate and may include a flexible plastic substrate. For example, the substrate SUB may include polyimide (PI).

The substrate SUB may include a display area DA and a non-display area NDA around the display area DA. The pixel layer PXL may be disposed in the display area DA. The pixel layer PXL may include a plurality of pixels, and each of the pixels may include a light emitting element.

The thin film encapsulation layer TFE may include at least two inorganic layers and an organic layer disposed between the inorganic layers. The inorganic layers may include an inorganic material and may protect the pixel layer PXL from moisture and oxygen. The organic layer may include an organic material and may protect the pixel layer PXL from a foreign substance such as dust particles.

The touch sensing unit TSP may be disposed on the thin film encapsulation layer TFE. The touch sensing unit TSP may sense an external input, such as a user's hand or a touch pen, and may convert the sensed external input to a predetermined input signal. The touch sensing unit TSP may include a plurality of sensing electrodes to sense the external input. The sensing electrodes may sense the external input by a capacitance method.

The touch sensing unit TSP may be manufactured directly on the thin film encapsulation layer TFE when the display module DM is manufactured. However, the inventive concepts should not be limited thereto. The touch sensing unit TSP may be manufactured as a touch panel separate from the display panel DP, and then, may be attached to the display panel DP by an adhesive.

The window WIN may protect the display panel DP and the touch sensing unit TSP from an external scratch and impact. The window WIN may be attached to the touch sensing unit TSP by the adhesive OCA. The adhesive OCA may be, but not limited to, an optical clear adhesive. The image generated by the display panel DP may be provided to the user through the window WIN.

As shown in FIG. 6, each pixel PX may include an organic light emitting element OLED and a transistor TR connected to the organic light emitting element OLED. The organic light emitting element OLED may include a first electrode E1, a second electrode E2, and an organic light emitting layer OEL disposed between the first electrode E1 and the second electrode E2. The first electrode E1 may be an anode, and the second electrode E2 may be a cathode.

The pixel PX may include a pixel area PA and a non-pixel area NPA around the pixel area PA. The organic light emitting element OLED may be disposed in the pixel area PA, and the transistor TR may be disposed in the non-pixel area NPA.

The transistor TR and the organic light emitting element OLED may be disposed on the substrate SUB. A buffer layer BFL may be disposed on the substrate SUB, and the buffer layer BFL may include an inorganic material. A semiconductor layer SM of the transistor TR may be disposed on the buffer layer BFL. The semiconductor layer SM may include an inorganic semiconductor, such as amorphous silicon or polycrystalline silicon, or an organic semiconductor. In addition, the semiconductor layer SM may include an oxide semiconductor.

Although not shown in FIG. 6, the semiconductor layer SM may include a source area, a drain area, and a channel area defined between the source area and the drain area.

A first insulating layer INS1 may be disposed on the buffer layer BFL to cover the semiconductor layer SM. The first insulating layer INS1 may include an inorganic material. A gate electrode GE of the transistor TR may be disposed on the first insulating layer INS1 to overlap the semiconductor layer SM. The gate electrode GE may be disposed to overlap the channel area of the semiconductor layer SM.

A second insulating layer INS2 may be disposed on the first insulating layer INS1 to cover the gate electrode GE. The second insulating layer INS2 may be defined as an interlayer insulating layer. The second insulating layer INS2 may include an organic material and/or an inorganic material.

A source electrode SE and a drain electrode DE of the transistor TR may be disposed on the second insulating layer INS2 to be spaced apart from each other. The source electrode SE may be connected to the source area of the semiconductor layer SM through a first contact hole CH1 defined through the first insulating layer INS1 and the second insulating layer INS2. The drain electrode DE may be connected to the drain area of the semiconductor layer SM through a second contact hole CH2 defined through the first insulating layer INS1 and the second insulating layer INS2.

A third insulating layer INS3 may be disposed on the second insulating layer INS2 to cover the source electrode SE and the drain electrode DE of the transistor TR. The third insulating layer INS3 may be defined as a planarization layer that provides a flat surface and may include an organic material.

The first electrode E1 may be disposed on the third insulating layer INS3. The first electrode E1 may be connected to the drain electrode DE of the transistor TR through a third contact hole CH3 defined through the third insulating layer INS3. The first electrode E1 may be defined as a pixel electrode.

A pixel defining layer PDL may be disposed on the first electrode E1 and the third insulating layer INS3 to expose a predetermined portion of the first electrode E1. An opening PX_OP may be defined through the pixel defining layer PDL to expose a predetermined portion of the first electrode E1.

The organic light emitting layer OEL may be disposed on the first electrode E1 in the opening PX_OP. The organic light emitting layer OEL may emit a light having a red, green, or blue color, however, it should not be limited thereto or thereby. The organic light emitting layer OEL may emit a white light by combining organic materials respectively generating red, green, and blue lights.

The second electrode E2 may be disposed on the pixel defining layer PDL and the organic light emitting layer OEL. The second electrode E2 may be defined as a common electrode.

The thin film encapsulation layer TFE may be disposed on the organic light emitting element OLED to cover the pixel PX. A layer between the substrate SUB and the thin film encapsulation layer TFE may be defined as the pixel layer PXL.

Although not shown in the drawings, a first voltage may be applied to the first electrode E1, and a second voltage may be applied to the second electrode E2. Holes and electrons are injected into the organic light emitting layer OEL and are recombined in the organic light emitting layer OEL to generate excitons. The organic light emitting element OLED may emit the light when an excited state of the excitons returns to a ground state. The organic light emitting element OLED may emit red, green, and blue lights according to the flow of current, so that the image may be displayed.

FIG. 6 shows a pixel structure according to an embodiment of the invention. However, the inventive concepts should not be limited to the pixel structure of FIG. 6.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:
a display module having a first area, a second area defined adjacent to the first area, and a protrusion part protruding from the second area, wherein the first area is exposed to an outside in a first state and a second state, and the second area is exposed to the outside in the second state;
a case accommodating the display module; and
a driver controlling the first state and the second state of the display module, the driver comprising:
a first driving module comprising a first motor fixed to the case and a first screw coupled to the first motor;
a second driving module comprising a second motor coupled to the first screw and configured to move in a direction closer to or farther away from the first motor and a second screw coupled to the second motor; and
a sliding module coupled to the second screw and configured to move in a direction closer to or farther away from the second motor;
wherein:
the case comprises:
a first case fixedly coupled to the display module and the first driving module; and
a second case coupled to the first case and configured to move in a direction closer to or farther away from the first case in a first direction; and
the display device further comprises at least two elastic members in which one end of each elastic member is fixed to the second case and the other end of each elastic member is fixed to opposite side surfaces of the protrusion part of the display module, and each of the elastic members is stretched in the second state of the display module and contracted in the first state of the display module.

2. The display device of claim 1, wherein one end of the sliding module is coupled to the second case, and the sliding module moves closer to or farther away from the second motor when the second case moves closer to or farther away from the first case.

3. The display device of claim 1, further comprising a roller configured to insert the display module into the case in the first state and pull out the display module from the case in the second state.

4. The display device of claim 1, wherein the sliding module comprises:
a first portion coupled to the second screw and extending in a first direction;

a second portion coupled to the display module and extending in a second direction crossing the first direction; and a third portion disposed between the first portion and the second portion to couple the sliding module to the case.

5. The display device of claim 4, wherein the second portion comprises a roller, and the display module is inserted into the case by the roller when the sliding module moves in the direction closer to the second motor and is pulled out from the case by the roller when the sliding module moves in the direction farther away from the second motor.

6. The display device of claim 4, wherein each of the first driving module and the second driving module is provided in plural.

7. The display device of claim 6, wherein the first portion of the sliding module is provided in plural, and the second screw of the second driving modules are respectively coupled to the first portions.

8. The display device of claim 1, wherein the second motor comprises:
 a motor part controlling a rotation of the second screw; and
 a connection part physically connecting the motor part to the first screw.

9. The display device of claim 1, wherein the second driving module is coupled to the first case to be slidable in the first direction.

10. The display device of claim 1, wherein a direction of a thread of the first screw is opposite to a direction of a thread of the second screw.

11. The display device of claim 1, wherein a length in a first direction of the first screw is substantially the same as a length in the first direction of the second screw.

12. The display device of claim 1, wherein the first screw extends in one side in a first direction, and the second screw extends in the other side opposite to the one side in the first direction.

13. A display device comprising:
 a display module comprising a first area, a second area defined adjacent to the first area, and a protrusion part protruding from the second area, wherein the first area is always exposed to an outside, and the second area is hidden from the outside in a first state and is exposed to the outside in the second state;
 a case accommodating the display module and comprising a first case and a second case slide-coupled to the first case;
 a driver fixed to the case to change an operating state of the display module to the first state or the second state while the second case slides; and
 a roller connected to the driver to insert the second area of the display module into the case or pull out the second area of the display module from the case, wherein:

the driver comprises:
 a first driving module fixed to an inner sidewall of the first case; and
 a second driving module coupled to the first driving module and configured to be movable;
the roller is fixed to the second case, coupled to the second driving module, and configured to be movable; and
the display device further comprises at least two elastic members in which one end of each elastic member is fixed to the second case and the other end of each elastic member is fixed to opposite side surfaces of the protrusion part of the display module, and each of the elastic members is stretched in the second state of the display module and contracted in the first state of the display module.

14. The display device of claim 13, wherein:
the first driving module comprises a first motor and a first screw coupled to the first motor and extending in one side in a first direction; and
the second driving module comprises a second motor coupled to the first screw and a second screw coupled to the second motor and extending in the other side opposite to the one side in the first direction.

15. The display device of claim 13, wherein the roller moves in a direction closer to the second driving module when the second driving module moves in a direction farther away from the first driving module and moves in a direction farther away from the second driving module when the second driving module moves in a direction closer to the first driving module.

16. The display device of claim 14, wherein a direction of a thread of the first screw is opposite to a direction of a thread of the second screw.

17. The display device of claim 14, wherein:
the roller comprises:
 a connection rod of which one end is connected to the second screw; and
 a roller rod extending from the other end of the connection rod in a second direction crossing the first direction; and
 the roller rod pulls out the second area of the display module from the case when the connection rod moves in a direction farther away from the second driving module and inserts the second area of the display module into the case when the connection rod moves in a direction closer to the second driving module.

18. The display device of claim 13, wherein:
the driver comprises a first driver and a second driver; and
the first driver is fixed to one sidewall of the case, and the second driver is fixed to the other sidewall opposite to the one sidewall of the case.

\* \* \* \* \*